United States Patent
Erkocevic-Pribic

(10) Patent No.: US 6,803,876 B2
(45) Date of Patent: Oct. 12, 2004

(54) IRREGULAR PRT DECONVOLUTION METHOD AND SYSTEMS, AND ITS USES

(75) Inventor: Radmila Erkocevic-Pribic, Delgauw (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 10/453,892

(22) Filed: Jun. 4, 2003

(65) Prior Publication Data
US 2004/0056794 A1 Mar. 25, 2004

(30) Foreign Application Priority Data
Jun. 5, 2002 (NL) .............................................. 1020763

(51) Int. Cl.$^7$ .............................................. G01S 13/00
(52) U.S. Cl. ...................... 342/159; 342/161; 342/162; 342/163; 342/196
(58) Field of Search ................................ 342/159, 160, 342/161, 162, 163, 195, 196, 26, 93, 98, 99, 137

(56) References Cited

U.S. PATENT DOCUMENTS

| | | | | |
|---|---|---|---|---|
| 4,400,700 A | * | 8/1983 | Rittenbach | .................. 342/100 |
| 4,737,788 A | * | 4/1988 | Kennedy | ..................... 342/29 |
| 5,376,940 A | * | 12/1994 | Abatzoglou | ................. 342/192 |
| 6,081,221 A | | 6/2000 | Zrnic et al. | |
| 2004/0056794 A1 | * | 3/2004 | Erkocevic-Pribic | ......... 342/196 |

FOREIGN PATENT DOCUMENTS

EP    1369703 A2 * 12/2003    ........... G01S/13/22

OTHER PUBLICATIONS

"Thinned stepped frequency waveforms to furnish existing radars with imaging capability", Freedman, A; Bose, R.; Steinberg, B.D.; Aerospace and Electronic Systems Magazine, IEEE, vol.: 11, Issue: 11, Nov. 1996 pp.: 39–43.*

"Suppressing the azimuth ambiguities in synthetic aperture radar images", Moreira, A.;Geoscience and Remote Sensing, IEEE Transactions on, vol.:31, Issue: 4, Jul. 1993 pp.:885–895.*

"Blind deconvolution for Doppler centroid estimation in high frequency SAR", Prati, C.; Rocca, F.; Kost, Y.; Damonti, E.;Geoscience and Remote Sensing, IEEE Trans on, vol.: 29, Issue: 6, Nov. 1991 Ps:934–941.*

(List continued on next page.)

Primary Examiner—John B. Sotomayor
(74) Attorney, Agent, or Firm—Lowe Hauptman Gilman & Berner, LLP

(57) ABSTRACT

This invention relates to radar signal processing. In particular, this invention concerns Doppler processing and clutter filtering on irregular Pulse Repetition Time (PRT) sampled signal.

This invention solves the above-mentioned drawbacks, in particular solving the velocity ambiguity and filtering any type of clutter, providing a deconvolution method which filter any kind of clutter even varying clutter like sea clutter, rain clutter . . .

The deconvolution method of irregular pulse repetition time sampled signal $x(t_m)$, comprises the following steps:
 [S1] conversion of the irregular samples $x(t_m)$ to regular samples $r(iT_e)$;
 [S2] computation of the spectrum $dft(r)$ of these regular samples;
 [S3] isolation of the clutter spectra in $dft(r)$ by assuming clutter spreads over more than a few range gates;
 [S4] estimation of the clutter spectral lines from the mean and the width of the isolated clutter spectra;
 [S5] subtraction of the estimated clutter spectra from the total spectrum $dft(r)$;
 [S6] deconvolution of the remaining spectra.

18 Claims, 3 Drawing Sheets

OTHER PUBLICATIONS

Maier M.W., "Non–Uniform PRI Pulse–Doppler Radar", Proceedings SSST, University of Alabama in Huntsville, Mar. 1993, pp. 164–168.

Chornoboy E.S., et al., "Variable–PRI Processing for Meterologic Doppler Radars", IEEE, 1994, pp. 85–90.

Feichtinger H.G., et al., "Efficient Numerical Methods in Non–Uniform Sampling Theory", Numerische Mathematik, Germany, 1995, pp. 423–440.

\* cited by examiner

IRREGULAR PRT DECONVOLUTION METHOD AND SYSTEMS, AND ITS USES

This invention relates to radar signal processing. In particular, this invention concerns Doppler processing and clutter filtering on irregular Pulse Repetition Time (PRT) sampled signal.

DESCRIPTION OF THE PRIOR ART

In conventional radar, Doppler processing uses discrete Fourier transform (DFT) on regularly sampled signals because the pulse repetition time is constant within a burst. So, such conventional processing using discrete Fourier transform (DFT) is not applicable to irregular Pulse Repetition Time (PRT) sampled signal.

Irregular Pulse Repetition Time (PRT) is usually meant to prevent blind speeds (velocity ambiguity), the jammers from locking on the radar's Pulse Repetition Time (PRT), and also to solve Doppler ambiguities.

Current work on irregular sampling is mostly motivated by image processing. Efficient algorithms based on frame operations have been developed as "Efficient numerical methods in non-uniform sampling theory" written by Feichtinger, H. G. and al in *Numerische Mathematik* 69 (NUHAG). Wavelet transform in digital filter banks as "Multirate systems and filter banks" written by Vaidyanathan, P. P. *Prentice-Hall Publishers* (1993) illustrates efficient 1D applications with irregular samples obtained by integer decimation or expansion of uniform samples.

In Doppler radar signal processing, Pulse Repetition Time (PRT) staggering has been studied, but with emphasis on the Fourier analysis, rather than on solving the irregular-sampling problem.

An exception is the NSSL algorithm proposed in the American patent U.S. Pat. No. 6,081,221 for Doppler weather radar. This NSSL algorithm offers a non-ambiguous solution in Doppler speed and does only ground clutter filtering. Such ground clutter has a mean frequency equal to zero because it does not move. So, clutter with any mean frequency like: sea clutter or rain clutter . . . can not be filtered with this proposed NSSL algorithm.

SUMMARY OF THE INVENTION

This invention solves the above-mentioned drawbacks, in particular solving the velocity ambiguity and filtering any type of clutter, providing a deconvolution method which filter any kind of clutter even varying clutter like sea clutter, rain clutter . . .

An object of this invention is a deconvolution method of irregular pulse repetition time sampled signal $x(t_m)$, which comprises the following steps:

[S1] conversion of the irregular samples $x(t_m)$ to regular samples $r(iT_e)$;

[S2] computation of the spectrum dft(r) of these regular samples;

[S3] isolation of the clutter spectra in dft(r) by assuming clutter spreads over more than a few range gates;

[S4] estimation of the clutter spectral lines from the mean and the width of the isolated clutter spectra;

[S5] subtraction of the estimated clutter spectra from the total spectrum dft(r);

[S6] deconvolution of the remaining spectra.

In a first embodiment of the deconvolution method, the computation in the steps of subtraction [S5] and deconvolution [S6] is adjusted to the clutter type by the clutter spectra given by step [S3].

A further object of this invention is deconvolution system of irregular pulse repetition time sampled signal $x(t_m)$, which comprises:

Mean for converting the irregular samples $x(t_m)$ to regular samples $r(iT_e)$;

Mean for computing the spectrum dft(r) of these regular samples;

Mean for isolating the clutter spectra in dft(r) by assuming clutter spreads over more than a few range gates;

Mean for estimating the clutter spectral lines from the mean and the width of the isolated clutter spectra;

Mean for subtracting the estimated clutter spectra from the total spectrum dft(r);

Mean for deconvolving of the remaining spectra.

Moreover, another object of this invention is the use of such deconvolution method in radar system.

A further object to this invention is the use of such deconvolution method as clutter filtering, in particular as sea clutter filtering.

BRIEF DESCRIPTION OF THE DRAWINGS

Further features and advantages of the invention will be apparent from the following description of examples of embodiments of the invention with reference to the drawing, which shows details essential to the invention, and from the claims. The individual details may be realised in an embodiment of the invention either severally or jointly in any combination.

MORE DETAILED DESCRIPTION

Figure 1A:
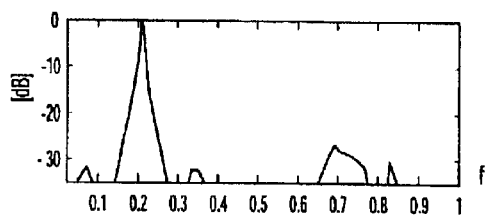
FIGS. 1a, 1b, 1c and 1d, Spectra obtained from irregular Pulse Repetition Time (PRT) sampled signal with four different prior art techniques: respectively, NSSL, NUHAG, wavelet and LSP methods, FIGS. 2a and 2b, Clutter of, respectively, land and sea given by NSSL, FIG. 3, Flow chart of significant steps in the method to filter clutter according to the invention.

Irregular sampling has not been used as widely as uniform sampling because the time and frequency analyses of irregular samples are rather involved.

Random sampling usually involves random numbers added to regular sampling times. The DFT-based power spectrum of random samples consists of the power spectrum of signal plus additive uncorrelated noise. For example, even with a noise-free signal sampled at the Nyquist sampling rate, the output signal-to-noise ratio could be 1 only.

Deterministic irregular sampling involves repeating periodically the same sequence of K irregular intervals with the mean sampling interval $T_s$. The sampling is usually called interlaced when K=2, and multirate or bunch when K has an arbitrary length. Since such a sampling set contains K regular sampling sets, DFT gives K peaks (per one frequency component of a signal) within the range limited by the sampling frequency $1/T_s$.

For any regular sampling set $\{nT\}$, such that $T \leq 1/(2B)$, a real signal x(t) limited to a frequency band B, writes as $x(t)=\Sigma_n x(nT) \cdot \sin c[2B(t-nT)]$. Irregular samples are well understood in theory, but their method are usually too complicated. For an irregular sampling set $\{t_n\}$, the reconstruction with bi-orthogonal bases $\{\sin c[2B(t-nT)]\}$ and $\{\Psi_n(t)\}$, writes as: $x(t)=\Sigma_n c_n \cdot \sin c[2B(t-t_n)]=\Sigma_n x(t_n) \Psi_n(t)$ where $c_n$ is the inner product of x(t) with $\{\Psi_n(t)\}$. If the set $\{t_n\}$ is limited as $|t-t_n|<1/(8B)$, $\Psi_n(t)$ is a Lagrange interpolation function. Basis functions can also be frames, i.e. bases whose orthogonality is not required. The frame conditions are much weaker and more useful for practical purpose.

The following prior art techniques illustrate the state of the art in the spectral analysis from irregular samples.

The Lomb-Scargle periodogram (LSP) is the classical DFT-based periodogram corrected by preserving the statistical behaviour and time-translation invariance. If the samples are irregular, the Lomb-Scargle periodogram (LSP) on multirate samples reveals the deterministic pattern as shown by FIG. 1d.

The wavelet transform of x(t) is given as $X(\alpha, \tau)$ with a wavelet shifted by $\tau$ and scaled by $\alpha$. The spectrum is represented by $|X(\alpha, \tau)|^2$, so-called scalogram. Current efficient wavelet transform algorithms support the uniform sampling with dyadic scaling and shifting ($\alpha=2^m$ and $\tau=n2^{-m}$). In this study, any irregular sampling is implemented in an existing Morlet wavelet. The wavelet transform is more robust, but its frequency resolution is very poor as shown by FIG. 1c. In general, wavelet transform is not applicable because radar echoes are periodic signals and, thus, wavelets can hardly serve as their convenient basis functions.

In the NUHAG frame decomposition, a complex bandlimited signal x(t) of finite energy, given by M irregular samples, is first rewritten as trigonometric polynomials p(t) of period 1 and degree K, K<M/2. The solution for the Fourier coefficients $a_k$, $|k| \leq K$, $x(\tau)=\Sigma_k \alpha_k \cdot \exp(j2\pi f_k \cdot \tau)$, $|f_k| \leq B$, is based on properties of the frame operator: $\Sigma_m p(t_m) \cdot D_K(t-t_m)$ where $D_K(t)=\Sigma_k \exp(j2\pi k.t)$, represents the frame. The NUHAG method illustrated by FIG. 1b is applicable for any sampling type but only up to the sampling frequency, what is unfortunately, not application for the radar applications.

The NSSL magnitude deconvolution is used for the ground radar Doppler processing of interlaced sampling scheme. In general, an NSSL sampling set $\{t_m\}$ is multirate with rate K and the mean interval $T_K$. An NSSL time interval $(t_{m+1}-t_m)$, as well as the whole sequence $KT_s$, are integer multiples of the largest common time interval $T_\epsilon$, $KT_s=LT_\epsilon$, so that the smallest regular set $\{iT_\epsilon\}$ can contain $\{t_m\}$, $\{t_m\} \subset \{iT_\epsilon\}$.

Thus, the irregular samples $x(t_m)$ are converted to the zero-padded samples $r(iT_\epsilon)$ being product of a sampling scheme $c_i$, $c_i=\delta(iT_\epsilon-t_m)$, and the regular samples $x(iT_\epsilon)$. Based on this relation: $r=\text{diag}(c).x$ (in the vector form), the spectrum of x, can be derived as follows:

$$dft(r)=dft(c)*dft(x)=C \cdot dft(x)$$

$$|dft(x)|=|C|^{-1} \cdot |dft(r)|$$

where C is a Toeplitz matrix whose row vectors are cyclically shifted dft(c). Since C is singular and, thus not invertible, the NSSL idea is to use the magnitudes instead. It is applicable only if there are no complex additions in the product C·dft(x). This condition implies the bandwidth of x, but it is not a constraint for most radar.

The spectrum $|dft(r)|$ contains L replicas of the spectrum $|dft(x)|$ that are weighted by coefficient from $|dft(c)|$, in a frequency range which is L/K times wider than the mean sampling frequency $f_s$. The deconvolution gives the strongest replica, i.e. the signal spectrum $|dft(x)|$.

Figure 1B:
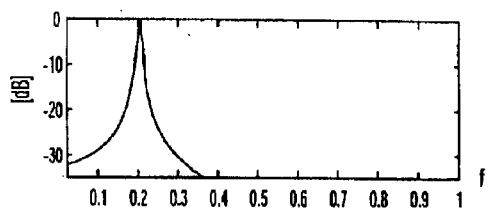
Figure 1C:
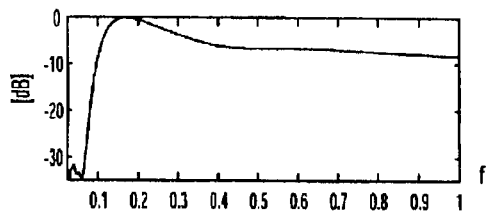
Figure 1D:
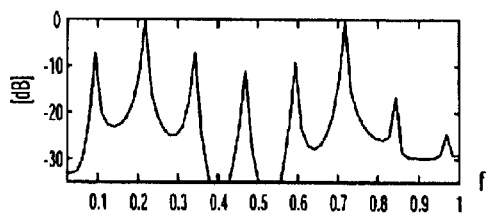

As shown by FIG. 1a, NSSL method is comparable with NUHAG method (FIG. 1b) for multirate samples. Furthermore, NSSL method enables solving the radar problems of Doppler ambiguity and ground clutter filtering. Unfortunately, the NSSL method is applicable only for ground radar applications.

Only the NSSL method supports frequencies above the Nyquist frequencies, namely up to L/K times the sampling frequency.

In track radar, where expected Dopplers are reasonably known, the signal spectra supported by NSSL may suffice. Namely, using the magnitudes in $$dft(r)=dft(c)*dft(x)=C \cdot dft(x)$$

$$|dft(x)|=|C|^{-1} \cdot |dft(r)|$$

implies that the spectrum of the signal x cannot be broader than N/L spectral lines, where N and L are the number of regular samples (i.e. the length of the vectors r and x) and the length of the basic irregular sequence, respectively. It can also work in the cases where the signal spectrum is broader than N/L, but no distance between the spectral lines can be an integer multiple of N/L.

The range of unambiguous frequencies may expand limitlessly, but clutter filtering becomes more involved with increasing complexity of the sampling.

Figure 2A:
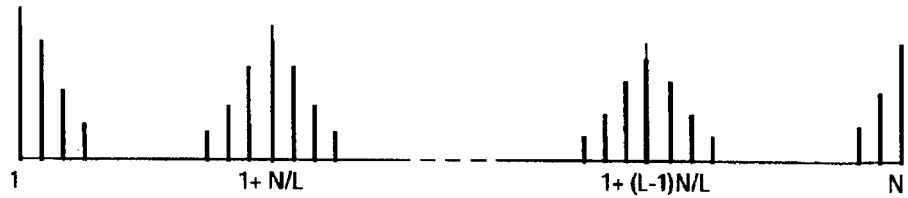
Figure 2B:
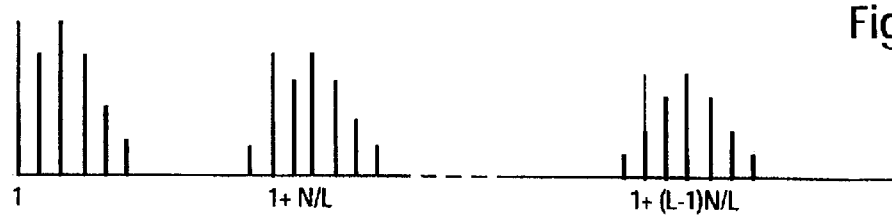
Figure 3:
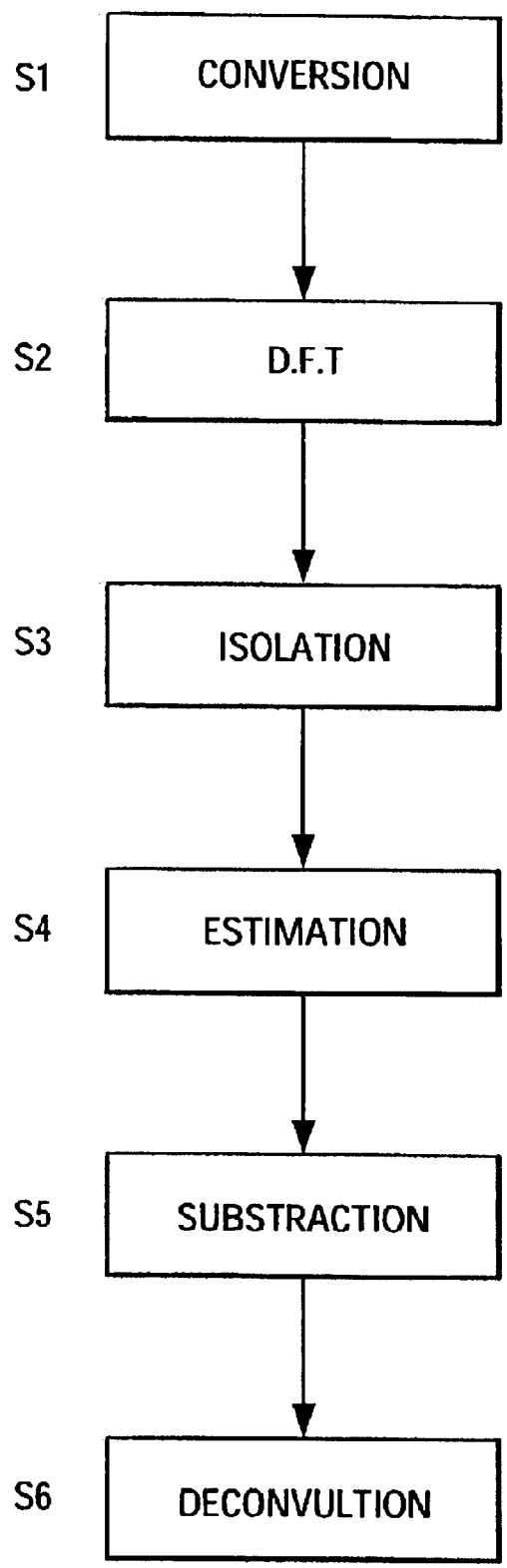

According to the invention, if the clutter bandwidth $B_{cl}$ is known, the complex clutter amplitudes can be estimated, and filtered from $|dft(r)|$, before the deconvolution. Thus, the filter according to the invention is adapted to the particular clutter type of the environment in which the signal is transmitted, e.g. sea clutter as shown by FIGS. 2 and 3.

Any kind of clutter can be estimated. A set $\{i\}$ is then centred at an integer corresponding to the mean Doppler as shown by FIGS. 3a and 3b for, respectively, land clutter and sea clutter.

In general, the amplitudes $g_{cl}(i, k)$ of the i-th clutter spectral component, $f_i \in B_{cl}$, $i \in [-I, J]$ repeated at the k-th non-zero-line of the code spectrum, k=1, L, can be estimated as follows:

$$\hat{g}_{cl}(i,k) = \begin{cases} d_k \sum_l d_l^* \cdot z_{i+1+(l-1)\frac{N}{L}} & \text{for } i \geq 0 \\ a_{k,L} \sum_l a_{l,L}^* \cdot z_{i+1+l\frac{N}{L}} & \text{for } i < 0 \end{cases}$$

where vectors d and $a_L$ contain L non-zero spectral components from dft(c), $d_1=\{dft(c)\}_{1+(l-1)N/L}$, $|dft(c)|=1$, $a_L=[d_2\ d_3\ \ldots\ d_L\ d_l]$, and z=dft(r).

In general, the integer interval $i \in [-I, J]$ is unknown. For estimating the clutter spectral lines, $f_i \in B_{cl}$, by using the correlation, the clutters are assumed to have a Gaussian shape and the received signals to be complex exponentials.

The Gaussian shape implies that the spectrum width $\sigma_{cl}$ can be estimated from the correlation coefficients $\rho(\tau)$ at the first two lags, as follows:

$$\sigma_f = \frac{\sqrt{\ln[\rho(\tau_1)/\rho(\tau_2)]}}{\sqrt{6}\pi\tau_1} \Rightarrow \sigma_{cl>3}\sigma_f$$

The clutter spectrum $\sigma_{cl}$ of three times $\sigma_f$ from the mean frequency to the left and to the right implies 99.7% of the spectrum. An optimum $\sigma_{cl}$ is a compromise between taking as much as possible of clutter spectra and leaving as much as possible signal spectra, and as such it should be treated as adaptive to a particular radar echo.

The mean Doppler frequency $\bar{f}_d$ can be estimate from the argument of the autocorrelation at the first lag $r(\tau), r(\tau) = \rho(\tau)\exp(j\omega_d\tau)$, as follows:

$$\bar{f}_d = arg[r(\tau_l)]/(2\pi\tau_l)$$

The deconvolution method according to the invention is illustrated by FIG. 3. This method can be summarised by the following steps:

[S1: conversion step] The irregular samples $x(t_m)$ are converted to regular samples $r(iT_e)$;

[S2: DFT step] The spectrum $dft(r)$ of these regular samples is computed;

[S3: isolation step] The clutter spectra are isolated by assuming clutter spreads over more than a few range gates;

[S4: estimation] The clutter spectral lines are estimated from the mean and the width of the isolated clutter spectra;

[S5: subtraction] The clutter spectra are subtracted from the total spectrum $dft(r)$;

[S6: deconvolution] The remaining spectra are deconvolved.

Wherein the steps S5 and S6, the computation are adjusted to the clutter type by the clutter spectra given by step S3.

In a second embodiment, the spectrum $dft(c)$ can also be computed and its L non-zero components found in step S2. In third embodiment, the amplitudes of the clutter spectra can be estimated in step S4. So, the convolution operations can be reduced, based on the L non-zero spectral components between the steps S5 and S6. In other embodiments, these second and third embodiments can be combined.

Furthermore, the clutter spectral lines can be estimated from the mean in $\bar{f}_d = arg[r(\tau_l)]/(2\pi\tau_l)$ and/or the width in $$\sigma_f = \frac{\sqrt{\ln[\rho(\tau_1)/\rho(\tau_2)]}}{\sqrt{6}\pi\tau_1} \Rightarrow \sigma_{cl>3}\sigma_f$$

of the isolated spectra [S4]. Moreover, the amplitudes of the clutter spectra can be estimated by $$\hat{g}_{cl}(i,k) = \begin{cases} d_k \sum_l d_l^* \cdot z_{i+1+(l-1)\frac{N}{L}} & \text{for } i \geq 0 \\ a_{k,L} \sum_l a_{l,L}^* \cdot z_{i+1+l\frac{N}{L}} & \text{for } i < 0 \end{cases} \quad [S4]$$

The convolution operation can be reduced in $$dft(r) = dft(c) * dft(x) = C \cdot dft(x)$$

$$|dft(x)| = |C|^{-1} \cdot |dft(r)|$$

before the remaining spectra in $$dft(r) = dft(c) * dft(x) = C \cdot dft(x)$$

$$|dft(x)| = |C|^{-1} \cdot |dft(r)|$$

are deconvolved [S6].

Figure 4A:
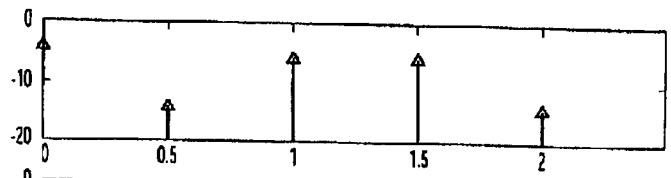
FIGS. 4a, 4b, 4c, 4d and 4e, Illustration of the method according to the invention, respectively, by spectra of the used irregular sampling, the simulated signal, the simulated sea clutter, the clutter filter input and output for a signal which is a noise-free complex exponential at frequency 1.2, and a Gaussian-shaped sea clutter with mean and bandwidth corresponding to sea state 5 when PRF and RF would be respectively 1 kHz and 1 GHz, FIGS. 5a, 5b, 5c, 5d and 5e, Illustration of the method according to the invention applied to target echo and sea clutter from FIG. 4 with added Gaussian noise and Weibull-distributed amplitude, respectively, by spectra of the used irregular sampling, the simulated signal, the simulated sea clutter, the clutter filter input and output for a signal which is a complex exponential at frequency 1.28, a Gaussian-shaped sea clutter with mean and bandwidth corresponding to sea state 5 when PRF and RF would be respectively 1 kHz and 1 GHz, and a target frequency at 1.28.
Figure 4B:
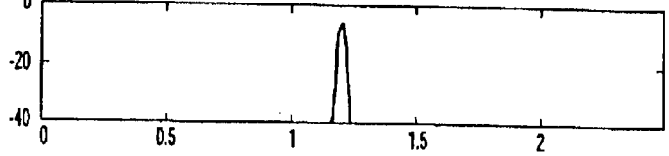
Figure 4C:
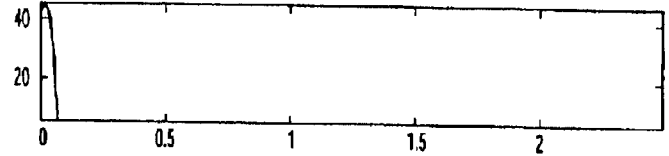
Figure 4D:
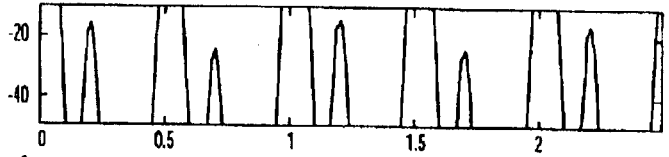
Figure 4E:
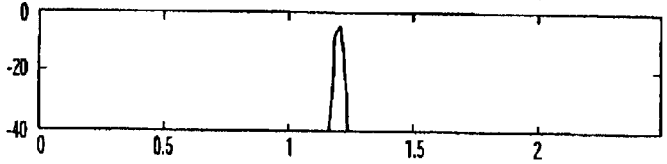

The deconvolution method according to the invention is illustrated in FIGS. 4a, 4b, 4c, 4d and 4e when the multirate sampling contains five non-zero spectral components as shown by FIG. 4a which modulate the input signal of FIG. 4d containing the noise-free target echo of FIG. 4b and non-random sea clutter of FIG. 4c. All these spectra are given in dB in function of normalised Doppler. The power spectral density (psd) of the sea clutter is assumed to be Gaussian shaped. The clutter filtering and deconvolution result in the frequency contents of the target echo as shown by FIG. 4e.

This deconvolution method in any of its embodiments is applied in radar system by a deconvolution system, which comprises:

A mean for converting the irregular samples $x(t_m)$ to regular samples $r(iT_e)$;

A mean for computing the spectrum $dft(r)$ of these regular samples;

A mean for isolating the clutter spectra in $dft(r)$ by assuming clutter spreads over more than a few range gates;

A mean for estimating the clutter spectral lines from the mean and the width of the isolated clutter spectra;

A mean for subtracting the estimated clutter spectra from the total spectrum $dft(r)$;

A mean for deconvolving of the remaining spectra.

Figure 5A:
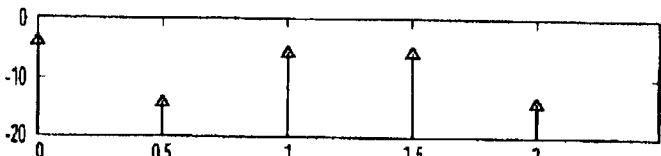
Figure 5B:
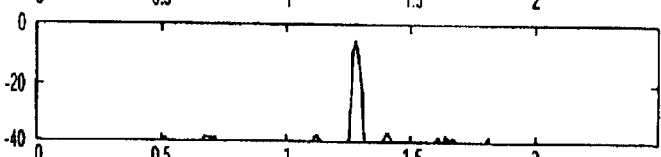
Figure 5C:
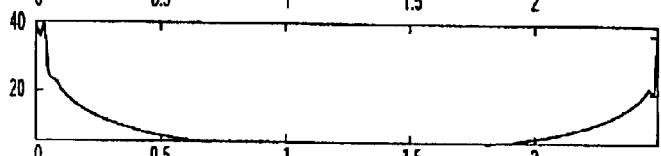
Figure 5D:
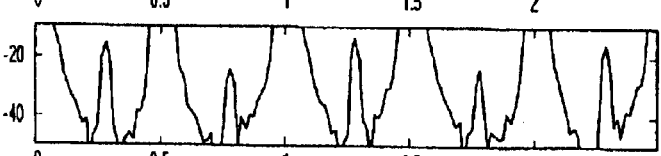
Figure 5E:
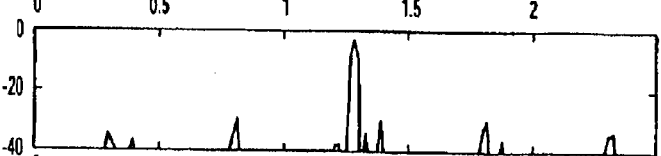

In FIGS. 5a, 5b, 5c, 5d and 5e, the deconvolution method according to the invention is applied to a more realistic scenario. Gaussian noise is added to the target echo as shown by FIG. 5b, and the sea clutter of FIG. 5c is made random. The clutter is normally distributed over irregular pulse repetition time (PRT) sampled signal having the correlation determined by the Gaussian shaped power spectral density, and with amplitude per range assumed to be Weibull distributed. The same sampling (FIG. 5a) modulates the input signal of FIG. 5d containing a noisy target echo (FIG. 5b) and a random sea clutter (FIG. 5c). All these spectra are given in dB in function of normalised Doppler. The deconvolution method according to the invention works better if the normalised Doppler frequency is adjusted to frequency 1.28. Changing the sampling frequency can do it. The clutter estimation and subtraction, which are followed by the deconvolution, result again in the frequency contents of the target echo as shown by FIG. 5e.

Other irregular sequences may be used which could be optimal for the Doppler range extension but also for the clutter filtering.

One advantage of the deconvolution method according to the invention is that it works above the Nyquist frequencies and offers filtering method for any kind of clutter, in particular: any "varying" clutter as sea clutter or rain clutter, but also non varying clutter as land clutter.

So, another application to the proposed method and filter may be "rain" clutter filtering, or even any clutter filtering (for "varying" and "not varying" clutter). So, it allows the use of this clutter filter in any kind of radar whatever the environment is. This because clutter filtering according to the invention is possible for clutter whose spectral lines are not necessarily centred at zero.

More generally, such deconvolution system may be used to deconvolve any kind of irregular sampled signal not only radar one.

What is to be claimed:

1. A deconvolution method of irregular pulse repetition time sampled signal $x(t_m)$ wherein the method comprises the following steps:
   converting of the irregular samples $x(t_m)$ to regular samples $r(iT_e)$;
   computing of a spectrum dft(r) of these regular samples;
   isolating of a clutter spectra in dft(r) by assuming clutter spreads over more than a few range gates;
   estimating of clutter spectral lines from the means and the width of the isolated clutter spectra;
   subtracting of estimated clutter spectra from total spectrum dft(r);
   devonvoluting of remaining spectra.

2. The deconvolution method according to claim 1 wherein, in said subtracting and deconvoluting steps, the computations are adjusted to the clutter type by the clutter spectra given by the isolating step.

3. The deconvolution method according to claim 1 wherein said step computing comprises computing of the sampling scheme spectrum dft(c) and searches its L non-zero components.

4. The deconvolution method according to claim 3 wherein, the convolution operations in the subtracting and deconvolution steps are reduced based on the L non-zero spectral components.

5. The deconvolution method according to claim 4 wherein the estimating step comprises also the amplitudes of the clutter spectra estimation.

6. The use of the deconvolution method according to claim 1 in a radar system.

7. The use of the deconvolution method according to claim 1 as clutter filtering.

8. The use of the deconvolution method according to claim 7 as sea clutter filtering.

9. The deconvolution system according to claim 2, wherein said computing step comprises of computing of the sampling scheme spectrum dft(c) and searches its L non-zero components.

10. A deconvolution system of irregular pulse repetition time sampled signal $x(t_m)$ comprising:
    converting means for converting the irregular samples $x(t_m)$ to regular samples $r(iT_e)$;
    computing means for computing the spectrum dft(r) of these regular samples;
    isolating means for isolating the clutter spectra in dft(r) by assuming clutter spreads over more than a few range gates;
    estimating means for estimating the clutter spectral lines from the means and the width of the isolated clutter spectra;
    subtracting means for subtracting the estimated clutter spectra from the total spectrum dft(r); and
    deconvolving means for deconvolving of the remaining spectra.

11. The deconvolution system according to claim 10 wherein the computation in the means for subtracting and the means for deconvolving are adjusted to the clutter type by the clutter spectra given by the means for isolating.

12. The deconvolution system according to claim 10 wherein the computing means computes the sampling scheme spectrum dft(c) and searches its L non-zero components.

13. The deconvolution system according to claim 12 wherein the convolution operations in the means for subtracting and the means for deconvolving are reduced based on the L non-zero spectral components.

14. The deconvolution system according to claim 10 wherein the means for estimating estimates also the amplitudes of the clutter spectra.

15. The deconvolution system according to claim 11, wherein the computing means computes the sampling scheme spectrum dft(c) and searches its L non-zero components.

16. The deconvolution system according to claim 11, wherein the convolution operations in the means for subtracting and the means for deconvolving are reduced based on the L non-zero spectral components.

17. The deconvolution system according to claim 11, wherein the means for estimating estimates also the amplitudes of the clutter spectra.

18. The deconvolution system according to claim 12, wherein the means for estimating estimates also the amplitudes of the clutter spectra.

* * * * *